US010416932B2

(12) United States Patent
Iyigun et al.

(10) Patent No.: US 10,416,932 B2
(45) Date of Patent: Sep. 17, 2019

(54) DIRTY DATA MANAGEMENT FOR HYBRID DRIVES

(71) Applicant: Microsoft Technology Licensing, LLC, Redmond, WA (US)

(72) Inventors: Mehmet Iyigun, Kirkland, WA (US); Yevgeniy M. Bak, Redmond, WA (US); Eric M. Bluestein, Seattle, WA (US); Robin A. Alexander, Woodinville, WA (US); Andrew M. Herron, Redmond, WA (US); Xiaozhong Xing, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/954,344

(22) Filed: Apr. 16, 2018

(65) Prior Publication Data

US 2018/0321857 A1    Nov. 8, 2018

Related U.S. Application Data

(63) Continuation of application No. 13/870,670, filed on Apr. 25, 2013, now Pat. No. 9,946,495.

(51) Int. Cl.
*G06F 12/00* (2006.01)
*G06F 13/00* (2006.01)
(Continued)

(52) U.S. Cl.
CPC ............ *G06F 3/068* (2013.01); *G06F 3/0611* (2013.01); *G06F 3/0659* (2013.01); *G06F 12/08* (2013.01); *G06F 12/023* (2013.01)

(58) Field of Classification Search
CPC ......... G06F 3/068; G06F 12/08; G06F 12/023
(Continued)

(56) References Cited

U.S. PATENT DOCUMENTS 6,058,048 A    5/2000  Kwon
7,085,879 B2   8/2006  Aasheim et al.
(Continued)

FOREIGN PATENT DOCUMENTS

CN    102301345 A    12/2011
CN    102591593 A     7/2012
(Continued)

OTHER PUBLICATIONS

"Office Action Issued in Indian Patent Application No. 5546/CHENP/2010", dated Mar. 21, 2018, 7 Pages.
(Continued)

*Primary Examiner* — Charles Rones
*Assistant Examiner* — Sidney Li
(74) *Attorney, Agent, or Firm* — Newport IP, LLC; Han Gim

(57) ABSTRACT

A hybrid drive includes multiple parts: a performance part (e.g., a flash memory device) and a base part (e.g., a hard disk drive). A drive access system, which is typically part of an operating system of a computing device, issues input/output (I/O) commands to the hybrid drive to store data to and retrieve data from the hybrid drive. Some data can be stored in one part but not the other, and this data can be synchronized with (e.g., copied to) the other part at various times. The drive access system provides indications to the hybrid drive of when to synchronize data in one part with the other part. These indications are made so that potential interference with use of the device by the user and/or power saving modes of the device due to the synchronization is reduced.

20 Claims, 6 Drawing Sheets

(51) Int. Cl.
  *G06F 13/28* (2006.01)
  *G06F 3/06* (2006.01)
  *G06F 12/08* (2016.01)
  *G06F 12/02* (2006.01)

(58) Field of Classification Search
  USPC .................................................. 711/162, 117
  See application file for complete search history.

(56) References Cited

U.S. PATENT DOCUMENTS

| | | | |
|---|---|---|---|
| 9,405,693 | B2 | 8/2016 | Ergan et al. |
| 2001/0015905 | A1 | 8/2001 | Kim et al. |
| 2003/0163630 | A1 | 8/2003 | Aasheim et al. |
| 2003/0163663 | A1 | 8/2003 | Aasheim et al. |
| 2004/0003223 | A1 | 1/2004 | Fortin et al. |
| 2004/0064647 | A1 | 4/2004 | Dewhitt et al. |
| 2004/0117441 | A1* | 6/2004 | Liu .................... G06F 12/0888 709/203 |
| 2005/0273554 | A1 | 12/2005 | Fortin et al. |
| 2005/0278522 | A1 | 12/2005 | Fortin et al. |
| 2005/0278523 | A1 | 12/2005 | Fortin et al. |
| 2006/0059326 | A1 | 3/2006 | Aasheim et al. |
| 2006/0064556 | A1 | 3/2006 | Aasheim et al. |
| 2007/0156969 | A1 | 7/2007 | Tian et al. |
| 2007/0233931 | A1 | 10/2007 | Tanaka et al. |
| 2010/0077197 | A1 | 3/2010 | Ergan et al. |
| 2012/0005422 | A1 | 1/2012 | Ergan et al. |
| 2013/0114354 | A1* | 5/2013 | Ryu .................... G11C 11/5628 365/189.011 |
| 2014/0122809 | A1* | 5/2014 | Robertson ............. G06F 12/084 711/141 |
| 2014/0181432 | A1* | 6/2014 | Horn .................... G06F 12/0253 711/159 |
| 2014/0325169 | A1 | 10/2014 | Iyigun et al. |
| 2015/0193147 | A1 | 7/2015 | Iyigun et al. |

FOREIGN PATENT DOCUMENTS

| | | |
|---|---|---|
| CN | 102831088 A | 12/2012 |
| RU | 2190260 C2 | 9/2002 |
| TW | 200531061 A | 9/2005 |
| WO | 2006006694 A1 | 1/2006 |

OTHER PUBLICATIONS

"Office Action Issued in Taiwan Patent application No. 098104862", dated Jun. 17, 2015, 2 Pages. (Without English Translation).

"Office Action Issued in Chinese Patent Application No. 201380075906.3", dated Apr. 3, 2018, 10 Pages.

"Office Action Issued in Indian Patent application No. 6301/CHENP/2008", dated Jan. 3, 2017, 7 Pages.

"International Preliminary Report on Patentability Issued in PCT Application No. PCT/US2014/020954", dated Dec. 19, 2014, 6 Pages.

PI0711731-0, "Office Action Issued in Brazil Patent Application No. PI0711731-0", dated Jun. 1, 2018, 5 Pages.

"Office Action Issued in European Application No. 13883186.2", dated Feb. 26, 2019, 5 Pages.

"Second Office Action Issued in Chinese Patent Application No. 201380075906.3", dated Mar. 1, 2019, 6 Pages.

\* cited by examiner

DIRTY DATA MANAGEMENT FOR HYBRID DRIVES

RELATED APPLICATION

This application is a continuation of and claims priority to U.S. patent application Ser. No. 13/870,670 filed Apr. 25, 2013 entitled "Dirty Data Management for Hybrid Drives", the disclosure of which is incorporated by reference herein in its entirety.

BACKGROUND

Computers have traditionally had storage devices on which data such as program instructions and user data can be stored. As technology has advanced, these storage devices have included magnetic floppy disks, magnetic hard disks, solid state drives (e.g., flash memory drives), and so forth. Some hybrid drives have also been developed that include both a larger capacity (but less expensive) hard drive and a smaller capacity (but more expensive) flash memory drive. Although such hybrid drives can be beneficial they are not without their problems. One such problem is that the smaller capacity drives can accumulate data that is later copied to the larger capacity drive, and it remains difficult for the hybrid drives to determine when to copy such data. A poor determination as to when to copy data to the larger capacity drive can interfere with the use of the device by the user, resulting in user frustration and poor performance of the device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, at a computing device an indication of an amount of dirty data at one or more priority levels in a part of a hybrid drive is obtained. The hybrid drive has two parts in which data can be stored including a performance part and a base part, and the dirty data refers to data that is stored in one of the two parts but not in the other of the two parts. Indications are provided to the hybrid drive of when to synchronize dirty data in the one of the two parts with the other of the two parts, the indications being determined so as to reduce interference with use of the computing device by a user and/or so as to reduce interference with a power saving mode of the computing device.

BRIEF DESCRIPTION OF THE DRAWINGS

The same numbers are used throughout the drawings to reference like features.

DETAILED DESCRIPTION

Dirty data management for hybrid drives is discussed herein. A hybrid drive includes multiple parts: a performance part (e.g., a flash memory device) and a base part (e.g., a hard disk drive). A drive access system, which is typically part of an operating system of a computing device, issues input/output (I/O) commands to the hybrid drive to store data to and retrieve data from the hybrid drive. Some data is stored in the performance part, and this data can be synchronized with (e.g., copied to) the base part at various times. The drive access system provides indications to the hybrid drive of when to synchronize data in the performance part with the base part. These indications are made so that potential interference with use of the device by the user and/or power saving modes of the device due to the synchronization is reduced, as discussed in more detail below. Similarly, some data stored in the base part can be synchronized with (e.g., copied to) the performance part at various times. The drive access system provides indications to the hybrid drive of when to synchronize data in the base part with the performance part. These indications are made so that potential interference with use of the device by the user and/or power saving modes of the device due to the synchronization is reduced, as discussed in more detail below.

Figure 1:
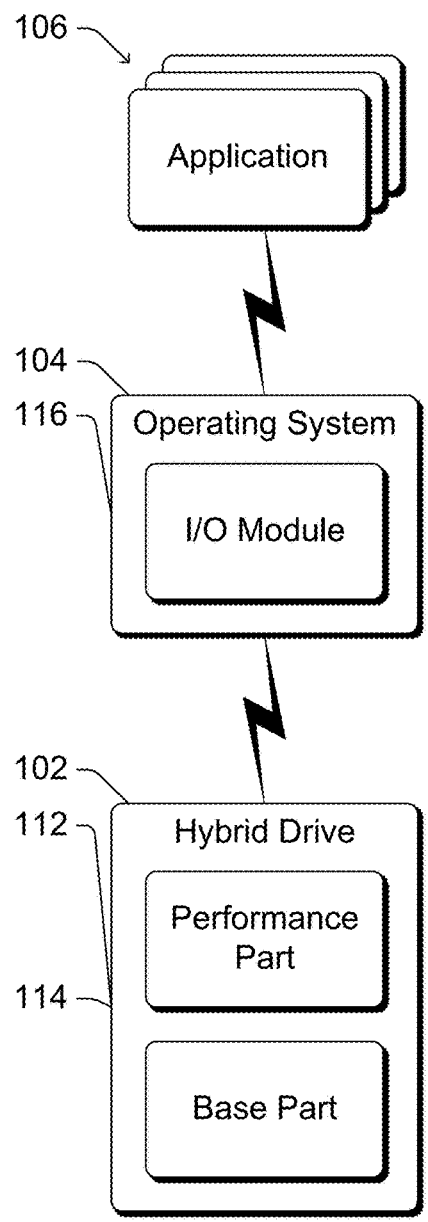
FIG. 1 illustrates an example system implementing the dirty data management for hybrid drives in accordance with one or more embodiments.

FIG. 1 illustrates an example system 100 implementing the dirty data management for hybrid drives in accordance with one or more embodiments. System 100 includes a hybrid drive 102, an operating system 104, and one or more applications 106. Hybrid drive 102 can be implemented in different manners, such as a fixed drive in a computing device, a removable device coupled to a computing device (e.g., via a Universal Serial Bus (USB) connection), and so forth.

In one or more embodiments, system 100 is implemented on a single computing device. System 100 can be implemented on a variety of different types of devices, such as a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, and so forth. Thus, system 100 can be implemented on computing devices ranging from full resource devices with substantial memory and processor resources (e.g., personal computers, game consoles, etc.) to low-resource devices with limited memory and/or processing resources (e.g., traditional set-top boxes, hand-held game consoles, etc.).

Alternatively, system 100 can be implemented on multiple different devices. For example, operating system 104 and applications 106 can be implemented on one device (e.g., any of a variety of different types of computing devices as discussed above) and hybrid drive 102 can be implemented as a separate device. When implemented separately, the device implementing operating system 104 can communicate with hybrid drive 102 in different manners, such as via a wired and/or wireless connection (e.g., via a USB connection, a wireless USB connection, etc.), via a network (e.g., via a local area network (LAN), a personal area network (PAN), etc.), and so forth.

Hybrid drive 102 includes two parts: a performance part 112 and a base part 114. Performance part 112 is a higher performance part than base part 114. The performance of parts 112 and 114 can refer to various different characteristics of the parts 112 and 114, such as the speed of the parts (e.g., the rate at which information can be read from and/or written to the parts) and/or the power consumption of the parts (e.g., the amount of power consumed by the parts when active and able to be read from and/or written to). Performance part 112 is faster and/or has less power consumption than base part 114, and thus is referred to as a higher performance part than base part 114. However, performance part 112 typically costs more per unit of storage (e.g., per gigabyte) than base part 114. Thus, base part 114 typically has more storage capacity than performance part 112, also referred to as base part 114 being larger than performance part 112 or the size of base part 114 being larger than the size of performance part 112.

Performance part 112 and base part 114 can be implemented in different manners. In one or more embodiments, performance part 112 is a solid state device (e.g., a flash memory device) and base part 114 is a rotational storage device (e.g., a magnetic hard disk drive). Alternatively, parts 112 and 114 can be implemented in other manners. For example, performance part 112 can be one type of solid state device (e.g., single-level cell (SLC) flash memory) and base part 114 can be another type of solid state device (e.g., multi-level cell (MLC) flash memory). By way of another example, one or both of parts 112 and 114 can be implemented using various other types of storage devices and technology, such as memristor memory technology, phase change memory technology, and so forth.

Although hybrid drive 102 includes multiple parts, hybrid drive 102 operates as a single storage drive from the perspective of operating system 104. The size (storage capacity) of hybrid drive 102 is the size of the larger of performance parts 112 and base part 114, which is typically base part 114 due to the lower cost per unit of storage of base part 114. Hybrid drive 102 is presented to operating system 104 as a single storage device—operating system 104 reads data from and writes data to hybrid drive 102 as if drive 102 were a single storage device. However, operating system 104 is aware that hybrid drive 102 includes multiple parts, and thus operating system 104 provides indications or hints to hybrid drive 102 as to the importance of various data to assist hybrid drive 102 in determining which part to store data in, as discussed in more detail below. Hybrid drive 102 can be presented to operating system 104 as a single storage device in various manners. For example, hybrid drive 102 can present itself to operating system 104 as a single storage device, hybrid drive 102 can be disparate devices that a hardware controller presents to operating system 104 as a single storage device, hybrid drive 102 can be multiple devices that a software driver running on the operating system 104 presents to operating system 104 as a single storage device, and so forth.

Operating system 104 includes an I/O module 116 that issues I/O commands to access hybrid drive 102, including commands to read data from hybrid drive 102 and commands to write data to hybrid drive 102. The commands to read and write data can be from other modules of operating system 104 as well as applications 106. As used herein, the data being read from and written to hybrid drive 102 includes any bits that are read from and/or written to hybrid drive 102—the data can include user data or program data, program instructions, binary code, and so forth.

Operating system 104 assigns priority levels to groups of logical block addresses (LBAs). An LBA is an address of a location on hybrid drive 102 where data is stored, and the data stored at that location is also referred to as the LBA data. The amount of data stored at a particular LBA can vary based on the manner in which hybrid drive 102 is implemented. The priority level assigned to a particular LBA is also referred to as being assigned to the data stored at that particular LBA. Because the priority levels are assigned to groups of LBAs, the priority levels can also be referred to as being assigned to groups of data (that are identified by the LBAs).

Operating system 104 assigns priorities to LBAs at a granularity of groups of multiple LBAs (although operating system 104 could alternatively assign priorities at a granularity of the LBAs). Using a granularity of groups of multiple LBAs, the size of a group of LBAs can vary, such as being a collection of LBAs at which 16 kilobytes of data is stored or a collection of LBAs at which 64 kilobytes of data is stored. In one or more embodiments, each group of LBAs is a contiguous range of addresses. Alternatively, a group can include LBAs in other manners in which case LBAs in a group may not be a contiguous range of addresses. Priority levels for groups of LBAs are assigned based on various information available to operating system 104, such as information regarding the frequency with which LBAs in the group are accessed, information regarding events occurring during or preceding access to an LBA, and so forth. An LBA is assigned the priority that is assigned to the group that includes the LBA, and all of the LBAs in the group are assigned the same priority.

For each I/O command issued to hybrid drive 102, I/O module 116 can include with the I/O command an indication of the priority level assigned to the LBA accessed by the I/O command. Although I/O module 116 can include an indication of the priority level assigned to the LBA accessed by the I/O command, I/O module 116 is not obligated to include the priority level and in some situations may not include a priority level.

The priority level assigned to an LBA can be maintained by hybrid drive 102 to facilitate management of LBAs in hybrid drive 102. The priority level is an indication of the perceived importance to operating system 104 of the data stored at the LBA (also referred to as the perceived importance of the LBA). Generally, the perceived importance of data refers to the speed at which access to the data is desired and/or the frequency with which the data is desired. Data to which fast access is desired (e.g., to improve the speed at which a computing device boots or launches an application) can be deemed to be of greater importance than data to which fast access is not as desirable. Furthermore, data that is accessed frequently can be deemed to be of greater importance than data that is accessed infrequently. Operating system 104 expects hybrid drive 102 to store data for LBAs (also referred to as storing the LBAs) in parts 112 and 114 based on their priority levels so that data at LBAs with higher priority levels are stored in performance part 112 (in addition to or rather than in base part 114). However, hybrid drive 102 is not bound or obligated to store data at LBAs of any particular priority level in performance part 112 and operating system 104 need not have, and typically does not have, knowledge of which of parts 112 and 114 data at a particular LBA is stored in. Which part data at a particular LBA is stored in is determined by hybrid drive 102 itself rather than operating system 104, although this determination is typically made by hybrid drive 102 based on the priority level indicated by I/O module 116.

It should be noted that although hybrid drive 102 determines which of parts 112 and 114 particular LBA data is stored in based on the indications from operating system 104, hybrid drive 102 can include an additional one or more modules to determine which of parts 112 and 114 particular LBA data is stored in. For example, hybrid drive 102 itself can monitor I/O accesses and determine based at least in part on this monitoring which of parts 112 and 114 particular LBA data is stored in. Operating system 104 need not, and typically does not, have knowledge of such additional modules or monitoring by hybrid drive 102, and continues to provide indications of priority levels to hybrid drive 102 as discussed herein regardless of any such additional modules or monitoring of hybrid drive 102.

It should also be noted that, although hybrid drive 102 is illustrated with two parts 112 and 114, each of these parts can be made up of multiple components. For example, performance part 112 may be made up of multiple flash memory chips or a single flash memory chip. By way of another example, base part 114 may be made up of a single hard disk drive or multiple hard disk drives. These different components can all be implemented in the same device (e.g., the same drive enclosure) or alternatively be spread across multiple devices (e.g., multiple different enclosures) coupled to one another (e.g., via a USB connection, a wireless USB connection, a network, etc.).

Furthermore, it should be noted that although hybrid drive 102 is discussed herein as including two parts, hybrid drive 102 can alternatively include three or more parts. These additional parts can be implemented in different manners (e.g., as discussed above with respect to performance part 112 and base part 114) using various nonvolatile memory, each providing a higher performance part than a next lower layer rather than providing a volatile cache (which may be included in hybrid drive 102 to temporarily store data for any of the two or more parts of hybrid drive 102). For example, hybrid drive 102 may include a middle performance part that is a higher performance part than base part 114 but a lower performance part than performance part 112. In such situations, the parts other than the base part 114 can also be referred to as performance parts. Regardless of the number of parts, indications of priority levels of LBAs are provided to hybrid drive 102 by operating system 104, and hybrid drive 102 determines which part or parts to store the LBAs on based on these priority level indications.

Figure 2:
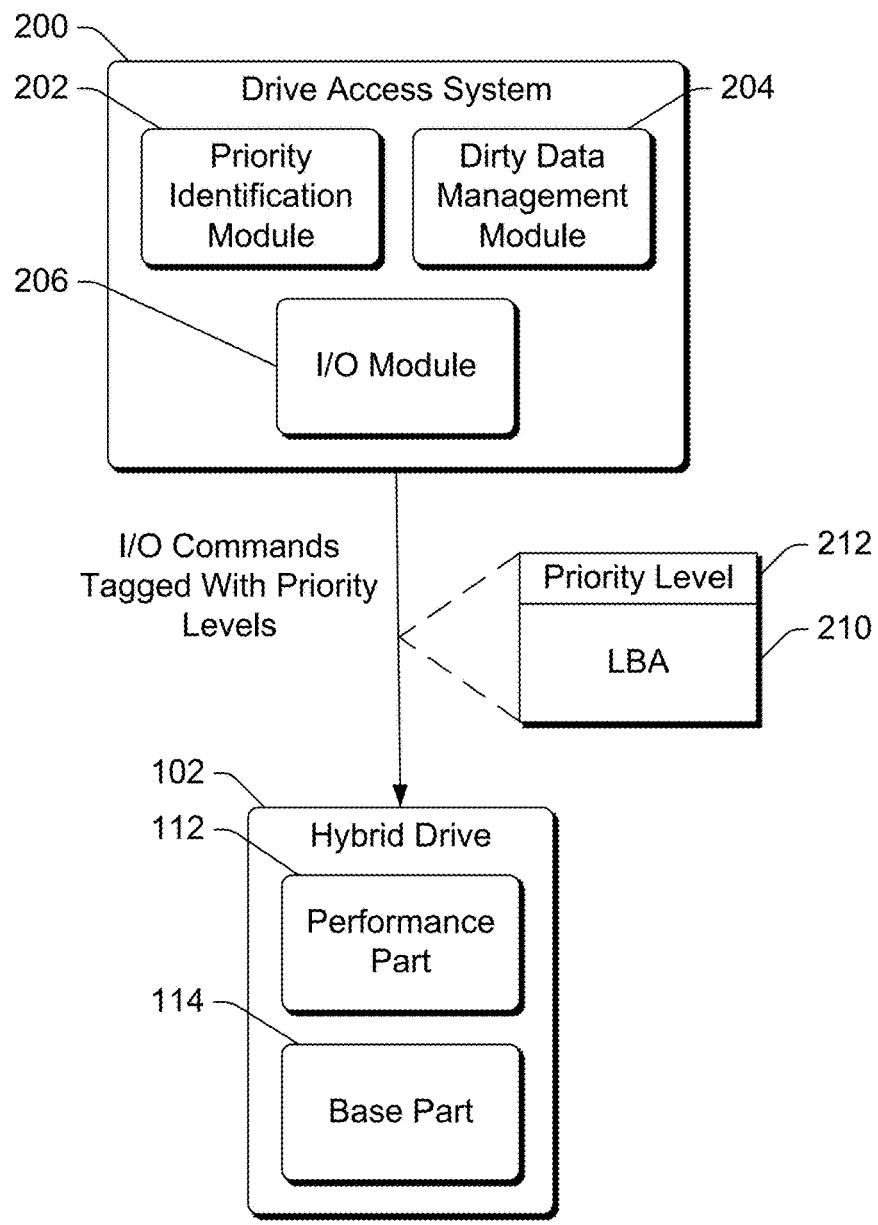
FIG. 2 illustrates an example drive access system in accordance with one or more embodiments.

FIG. 2 illustrates an example drive access system 200 in accordance with one or more embodiments. Drive access system 200 can be implemented as part of an operating system, such as operating system 104 of FIG. 1. Alternatively, drive access system 200 can be implemented as part of another program or application that accesses hybrid drive 102, such as a Web browser program, a data access or storage program, and so forth.

Drive access system 200 includes a priority identification module 202, a dirty data management module 204, and an I/O module 206. I/O module 206 and I/O module 116 of FIG. 1 can be the same module. Drive access system 200 can be implemented as part of a single device (e.g., as part of an operating system of a computing device) or across multiple devices. For example, dirty data management module 204 and I/O module 206 may be implemented by one computing device, and at least part of priority identification module 202 implemented by another device (e.g., a server coupled to the computing device via a network).

Generally, priority identification module 202 obtains priority levels assigned to particular LBAs. Priority identification module 202 can obtain the priority levels in different manners, such as determining priority levels for LBAs based on information regarding I/O accesses to hybrid drive 102, obtaining the priority levels for LBAs from a remote service or system, being pre-configured with priority levels for LBAs, combinations thereof, and so forth. As I/O module 206 issues I/O commands to hybrid drive 102, I/O module 206 provides to hybrid drive 102 indications of the priority levels assigned to particular LBAs associated with those I/O commands. For example, an LBA 210 assigned a priority level 212 is illustrated in FIG. 2. Additional data (e.g., to be written to hybrid drive 102) can also be sent to hybrid drive 102 along with LBA 210 and priority level 212.

Dirty data management module 204 determines when it is desirable to synchronize dirty data in performance part 112 with base part 114. Dirty data refers to data that is stored in one part of hybrid drive 102 but not in another part (e.g., data stored in performance part 112 but not in base part 114, data stored in base part 114 but not in performance part 112). For example, an I/O command issued by I/O module 206 can result in data that is written to performance part 112 but not base part 114. Module 204 can provide indications to the hybrid drive 102 to synchronize dirty data to base part 114 (e.g., copy dirty data to base part 114) or not synchronize dirty data to base part 114 as discussed in more detail below.

Generally, data is assigned a particular priority level based on whether placing the data in performance part 112 is expected to increase the user-noticeable speed of the device (e.g., the speed at which a computing device boots or launches an application) and/or reduce the power consumption of the computing device. For example, data read when booting the computing device, resuming the computing device from hibernation, transferring or swapping pages of memory out of volatile memory to hybrid drive 102, launching an application on the computing device, and so forth can be assigned a higher priority level than other general usage data (e.g., data accessed by applications when running) to increase the user-noticeable speed of the device due to such data being more likely to be stored in performance part 112. Additionally, data can be assigned a particular priority level so that there is a sufficient amount of data (e.g., 1 gigabyte or 4 gigabytes of data) at a lowest priority level in performance part 112 so that LBA data assigned the lowest priority level can be removed from performance part 112 and stored in base part 114 as desired (thus keeping LBA data with a higher priority level in performance part 112).

Maintaining a sufficient amount of data at a lowest priority level in performance part 112 allows hybrid drive 102 to churn data at the lowest priority level in performance part 112 without adversely affecting data at higher priority levels in performance part 112. In situations where there is insufficient space in performance part 112 to store LBA data for all I/O accesses to hybrid drive 102, hybrid drive 102 transfers data from performance part 112 to base part 114 (which can include copying data from performance part 112 to base part 114 prior to deleting the data, or deleting data from performance part 112 that has already been copied to base part 114) starting with data at the lowest priority (and for data at that that lowest priority, according to some policy such as transferring the least recently used (LRU) data first). Keeping the amount of data at the lowest priority relatively large when compared to data at higher priorities ensures that as space in performance part 112 becomes scarce, there is low priority data to transfer to base part 114 first, and therefore higher priority data is less likely to be transferred.

Additionally, by keeping the amount of data at the lowest priority relatively large, data added to performance part 112 at the lowest priority is permitted to remain in performance part 112 for a reasonably long amount of time even though performance part 112 may be relatively full. E.g., by implementing an LRU policy in determining which data is transferred out of performance part 112 first, there is a sufficient amount of data (e.g., 1 gigabyte of data, 4 gigabytes of data, etc.) that would be transferred out of performance part 112 before the newly added data is transferred out of performance part 112.

Multiple different priority levels can be supported by drive access system 200, and the priority levels can be labeled in different manners. In one or more embodiments there are four priority levels, labeled as: Priority Level 4, Priority Level 3, Priority Level 2, and Priority Level 1. However, there can alternatively be any number of priority levels. The priority levels can also be labeled in different manners, such as using letters, different characters or symbols, and so forth. In addition to the priority levels, drive access system 200 may support no priority level for some LBAs. LBA data assigned no priority level is stored in base part 114 rather than performance part 112—no determination need be made by hybrid drive 102 as to which part the LBA data is stored in. Which LBAs are assigned no priority level can be determined in different manners, such as based on an amount of data or pattern of data access. For example, accessing a large amount (e.g., greater than a threshold amount) of data sequentially may result in the LBAs for such data being assigned no priority level so that the data is stored in base part 114 and does not adversely affect the lifetime (e.g., the number of times each cell of a solid state disk can be written to before the cell ceases functioning properly and can no longer be written to) of performance part 112. It should also be noted that in one or more embodiments hybrid drive 102 can implement one or more additional hidden or private priority levels. These additional hidden or private priority levels are not used by and are not visible to drive access system 200, but can be used by hybrid drive 102 to manage where LBA data is stored according to internal policy of hybrid drive 102.

Drive access system 200 receives indications from hybrid drive 102 as to how many LBAs are stored (or how much storage space is used) in performance part 112 at each of the various priority levels, as well as how much dirty data is stored in performance part 112 at each of the various priority levels (or at least at one or more low priority levels). When an I/O command issued by I/O module 206 writes data to the hybrid drive 102, depending on the priority level associated with the LBA that is written, the data may be stored in performance part 112 rather than base part 114. This data that is stored in performance part 112 but not in base part 114 is referred to as dirty data until the data is synchronized with base part 114. Hybrid drive 102 maintains a record of which data in performance part 112 is dirty data and which data in performance part 112 is not dirty data. Data that is not dirty is also referred to as clean data.

Dirty data in performance part 112 can be synchronized with base part 114, which refers to copying or moving the dirty data to base part 114. In one or more embodiments, the dirty data is copied from performance part 112 to base part 114, and the record maintained by hybrid drive 102 is updated to reflect that the data is clean data. The clean data in performance part 112 can then be overwritten as desired by hybrid drive 102 (e.g., LRU clean data can be overwritten by newly received data). Alternatively, the dirty data can be moved from performance part 112 to base part 114, and no longer stored in performance part 112.

In one or more embodiments, priority levels are assigned to LBAs so that a sufficient amount of data (e.g., 1 gigabyte of data, 4 gigabytes of data, etc.) is at a low priority level. This low priority level is the lowest priority level supported by the drive access system 200, although the hybrid drive 102 may support lower priority levels unbeknownst to the drive access system 200. Having this amount of data at a low priority level allows data at the low priority level to be written to performance part 112, synchronized over time with base part 114, and then be overwritten by newly received data at the low priority level, all while data at higher priority levels remains in performance part 112. Thus, data at the low priority level may be replaced by newly received data, but data at high priority levels need not be.

Drive access system 200 can monitor various information regarding the state of the device implementing system 200, types of I/O commands being issued by I/O module 206, and so forth. Drive access system 200 leverages this information, as well as the indication of how much dirty data is stored in performance part 112 at the low priority level, to determine when to provide indications to hybrid drive 102 to synchronize dirty data. This monitored information includes information oftentimes not available to hybrid drive 102, allowing drive access system 200 to make more intelligent decisions regarding when dirty data is to be synchronized than can be made by hybrid drive 102.

In one or more embodiments, the final determination of when to synchronize dirty data in performance part 112 is made by hybrid drive 102. Drive access system 200 provides indications to hybrid drive 102 of when to synchronize dirty data, and hybrid drive 102 is expected to synchronize the dirty data in accordance with the indications provided by drive access system 200. However, hybrid drive 102 is not obligated to synchronize the dirty data in accordance with the indications provided by drive access system 200—the decision of when to synchronize dirty data remains with hybrid drive 102.

Dirty data management module 204 determines when to provide indications to hybrid drive 102 to synchronize dirty data. The determination can be made based on a current state of the device, which can include whether the user is active on the device (e.g., the user being active on the device in situations where the user is interacting with the device or using a program running on the device, in situations where data is being written to hybrid drive 102, etc.). In one or more embodiments, during times when the user is active on the device, the determination of when to provide indications to hybrid drive 102 to synchronize dirty data is made so as to reduce interference with use of the device by the user. The indications provided to hybrid drive 102 can be, for example, indications to delay synchronizing data in situations where synchronizing data may interfere with use of the device by the user, and to hasten synchronizing data in situations where synchronizing data would not interfere with use of the device by the user.

Interference with use of the device by the user can occur when the user is active on the device and being active on the device results in data being read from and/or written to hybrid drive 102 by a program. An I/O command reading or writing such data is referred to as a user I/O command, and if a user I/O command issued by I/O module 206 to hybrid drive 102 were to be interfered with (e.g., delayed) due to hybrid drive 102 synchronizing dirty data, the use of the device by the user could be interfered with (e.g., a delay noticeable to the user may occur in reading and/or writing data). By reducing situations in which user I/O commands are interfered with by hybrid drive 102 synchronizing dirty data, interference with use of the device by the user can be reduced.

Interference with use of the device by the user can also be reduced in other manners. In one or more embodiments, data being read from and/or written to hybrid drive 102 may have different I/O priorities, referring to an importance of the I/O being performed. Some I/O priorities may be high, such as reading or writing data for a program used by the user, reading or writing data for a component of the operating system managing communications with another device, and so forth. Other I/O priorities may be low, such as reading or writing data for a component of the operating system performing maintenance on hybrid drive 102 (e.g., defragmenting hybrid drive 102). By reducing situations in which I/O commands for high priority I/O's are interfered with by hybrid drive 102 synchronizing dirty data, interference with use of the device by the user can be reduced. However, I/O commands for low priority I/O's can be interfered with by hybrid drive 102 synchronizing dirty data without interfering with use of the device by the user because interference with such low priority I/O's do not impact the user (e.g., do not result in user-noticeable interference with use of the device).

A current state of the device can additionally or alternatively include a current power mode of the device, including whether the device is operating in a power saving mode and/or an indication of which of multiple power saving modes the device is operating in. In one or more embodiments, the determination of when to provide indications to hybrid drive 102 to synchronize dirty data is made so as to reduce interference with power saving modes of the device. An I/O command issued by I/O module 206 to hybrid drive 102 when the device is operating in a power saving mode can interfere with the power saving mode, such as by expending power to access hybrid drive 102 (or part of hybrid drive 102) when drive 102 (or part of drive 102) would not otherwise be accessed while in the power saving mode. For example, if base part 114 is a hard disk drive and the device is operating in a power saving mode in which the hard disk drive is not spinning, then synchronizing dirty data could interfere with the power saving mode of the device because power would be consumed in spinning up the hard disk drive as well as spinning the hard disk drive to write data to the drive, when the drive would otherwise not have been spinning due to the power saving mode. The indications provided to hybrid drive 102 can be, for example, indications to delay synchronizing data in situations where synchronizing data may interfere with a power saving mode of the device, and to hasten synchronizing data in situations where synchronizing data would not interfere with a power saving mode of the device.

A current state of the device can additionally or alternatively include a remaining battery life of the device, which indicates an amount of charge left in a battery of the device. In one or more embodiments, the determination of when to provide indications to hybrid drive 102 to synchronize dirty data is made so as to reduce interference with the remaining battery life of the device (and thereby reduce interference with a power saving mode of the computing device). The device can be determined to be operating in a power saving mode in response to the remaining battery life of the device satisfying (e.g., being at or below) a threshold amount.

An I/O command issued by I/O module 206 to hybrid drive 102 when the device has a low remaining battery life (e.g., less than a threshold amount of charge remaining) can interfere with the remaining battery life of the device, such as by expending power to access hybrid drive 102 (or part of hybrid drive 102) when the device has a low remaining battery life. The indications provided to hybrid drive 102 can be, for example, indications to delay synchronizing data in situations where synchronizing data may interfere with the remaining battery life of the device (and thus the device is determined to be operating in a power saving mode), and to hasten synchronizing data in situations where synchronizing data would not interfere with the remaining battery life of the device (and thus the device is determined to not be operating in a power saving mode (e.g., operating in a standard, high power, or non-power-saving mode).

The indications provided to hybrid drive 102 to synchronize dirty data can take various forms. In one or more embodiments, hybrid drive 102 supports a dirty data low threshold and a dirty data high threshold, and the indications provided to hybrid drive 102 to synchronize dirty data are changes in settings for one or both of these dirty data thresholds.

Figure 3:
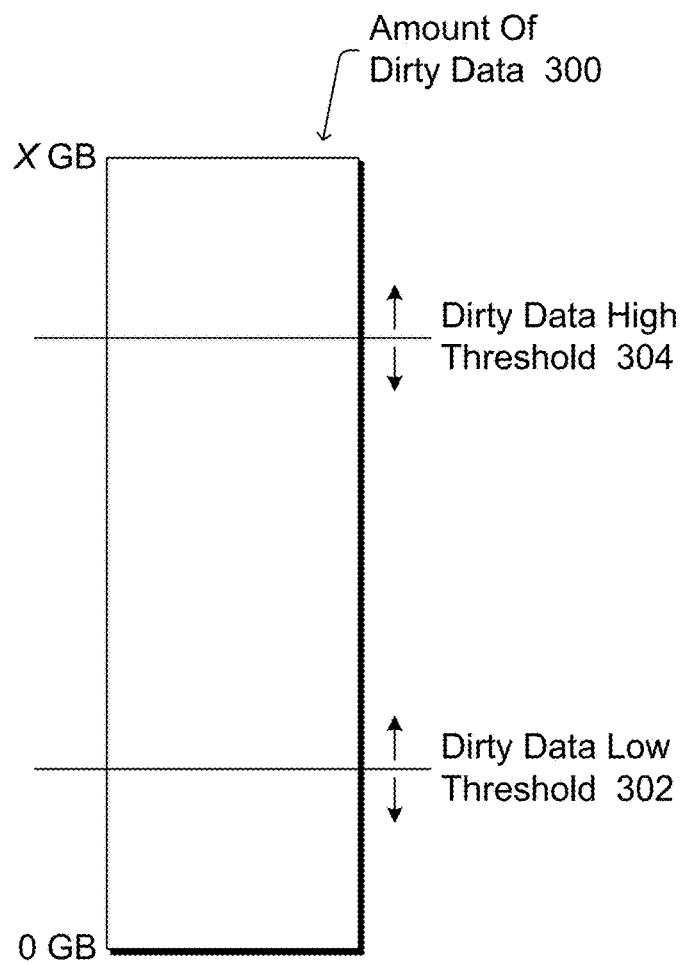
FIG. 3 illustrates an example of dirty data thresholds in accordance with one or more embodiments.

FIG. 3 illustrates an example of dirty data thresholds in accordance with one or more embodiments. An indication of an amount of dirty data 300 is maintained. The amount of dirty data can vary, for example ranging from 0 gigabytes (GB) of data to multiple (X) gigabytes of data. The value of X can vary, such as ranging up to the amount of data at the low priority level that can be included in performance part 112 (e.g., 1 gigabyte of data, 4 gigabytes of data, etc.).

Hybrid drive 102 uses a dirty data low threshold 302 and a dirty data high threshold 304 in deciding when to synchronize dirty data. Hybrid drive 102 begins synchronizing dirty data in response to the amount of dirty data 300 satisfying (e.g., being equal to and/or greater than) the dirty data high threshold 304. Once synchronizing dirty data has begun, hybrid drive 102 continues synchronizing dirty data until the amount of dirty data 300 satisfies (e.g., is equal to and/or less than) the dirty data low threshold 302, at which point hybrid drive 102 ceases synchronizing dirty data.

The thresholds 302 and 304 can have different settings, and the dirty data high threshold 304 setting is greater than or equal to the dirty data low threshold 302 setting. Dirty data management module 204 of drive access system 200 issues commands to hybrid drive 102 to change the dirty data low threshold 302 setting and/or the dirty data high threshold 304 setting. Dirty data management module 204 can thus provide indications to hybrid drive 102 to synchronize dirty data by changing the threshold 302 and/or 304 settings. This ability to change settings is illustrated in FIG. 3 by arrows showing that the thresholds 302 and 304 can be moved up (indicating more dirty data) and down (indicating less dirty data).

Dirty data management module 204 can provide indications to hybrid drive 102 to synchronize dirty data by changing the threshold 302 and/or 304 settings in different manners. Module 204 can increase or raise dirty data high threshold 304 to delay hybrid drive 102 synchronizing dirty data, and can decrease or lower dirty data high threshold 304 to have hybrid drive 102 synchronize dirty data sooner. For example, module 204 can decrease dirty data high threshold 304 to a current amount of low priority dirty data in performance part 112 at the current time in order to have hybrid drive 102 synchronize dirty data at the current time. Module 204 can increase or raise dirty data low threshold 302 to decrease an amount of data dirty data that hybrid drive 102 synchronizes, and can decrease or lower dirty data low threshold 302 to increase the amount of dirty data that hybrid drive 102 synchronizes.

In the discussions herein, reference is made to example values for the amounts of dirty data, the amounts of clean data, dirty data high threshold settings, dirty data low threshold settings, and so forth. It should be noted that these examples are merely examples, and that various other values can be used with the techniques discussed herein.

In one or more embodiments, dirty data management module 204 provides indications to hybrid drive 102 to synchronize dirty data to attempt to keep at least a particular amount (e.g., N gigabytes) of clean data at one or more priority levels (e.g., low priority clean data) at any given time. In one or more embodiments, the value of N is the largest of: 4 gigabytes, the amount of RAM in the device implementing drive access system 200, and 25% of the size of performance part 112.

Default or initial setting values can be used by dirty data management module 204 for dirty data low threshold 302 and/or dirty data high threshold 304. For example, the default or initial value for the dirty data high threshold 304 can be a fixed amount (e.g., 512 megabytes) or a relative amount (e.g., 10% of the amount of clean data at one or more priority levels, such as the low priority level). By way of another example, the default or initial value for the dirty data low threshold 302 can be a fixed amount (e.g., 128 megabytes) or a relative amount (e.g., 3% of the amount of clean data at one or more priority levels, such as the low priority level).

In one or more embodiments, one or both of the dirty data high threshold 304 setting and the dirty data low threshold 302 setting are determined based on a current state of the device implementing drive access system 200. The current state of the device can include, for example, whether the user is active on the device, a current power mode of the device, a remaining battery life of the device, and so forth as discussed above.

Dirty data management module 204 can determine a current power mode of the device in a variety of different manners, such as by accessing a storage area where the current power mode of the device is recorded, receiving a notification of the current power mode of the device from an operating system of the device, and so forth. Dirty data management module 204 classifies one or more power modes of the device as power saving modes. Which power modes are classified as power saving modes can be determined in various manners, such as based on particular pre-defined power modes (e.g., the device may have a set of multiple pre-defined power modes and module 204 is pre-configured with an indication of which one or more of those multiple pre-defined power modes are power saving modes), based on information obtained from other services or systems, based on particular device settings (e.g., screen brightness, power mode of a processor of the device, remaining battery life of the device, etc.), and so forth.

The dirty data high threshold 304 setting can vary based on the current power mode of the device. If the device is in a power saving mode, dirty data management module 204 increases dirty data high threshold 304 to increase the amount of dirty data 300 that accumulates before synchronizing the dirty data begins, and thus delaying synchronizing the dirty data. Delaying synchronizing the dirty data allows expending energy in accessing base part 114 to be delayed, and avoided if the device ceases being in a power saving mode prior to the increased dirty data high threshold 304 being satisfied. The amount that dirty data high threshold 304 is increased can vary, and can be a fixed amount (e.g., 1 gigabyte) or a relative amount (e.g., 50% of the current setting, 40% of the amount of clean data at one or more priority levels (such as the low priority level), etc.). If the power mode of the device changes so that the device is no longer in a power saving mode, drive access system 200 decreases dirty data high threshold 304 (e.g., to the default or initial setting value for threshold 304).

Additionally or alternatively, the dirty data low threshold 302 setting can vary based on the current power mode of the device. If the device is in a power saving mode, dirty data management module 204 decreases dirty data low threshold 302 to increase the amount of dirty data 300 that is synchronized (and reduce the frequency with which energy is expended in accessing base part 114). The amount that dirty data low threshold 302 is decreased can vary, and can be a fixed amount (e.g., 64 megabytes) or a relative amount (e.g., 50% of the current setting, 1% of the amount of clean data at one or more priority levels (such as the low priority level), etc.). Alternatively, dirty data management module 204 can increase or decrease dirty data low threshold 302 as appropriate (based on dirty data high threshold 304) so that a particular amount of dirty data is synchronized. The amount that dirty data low threshold 302 is increased or decreased can be a fixed amount (e.g., 256 megabytes less than dirty data high threshold 304) or a relative amount (e.g., 50% of dirty data high threshold 304). If the power mode of the device changes so that the device is no longer in a power saving mode, dirty data management module 204 increases dirty data low threshold 302 (e.g., to the default or initial setting value for threshold 302).

Dirty data management module 204 can determine whether the user is active on the device in a variety of different manners, such as by accessing a storage area where an indication of device activity is recorded, receiving a notification of device activity from an operating system of the device, monitoring the I/O commands issued by I/O module 206 (e.g., areas of memory accessed, types of I/O commands, etc.), and so forth. For example, if input is being received via a user input device (e.g., microphone, keyboard, mouse, etc.), then the user can be determined to be interacting with the device and thus active on the device. By way of another example, if data is being streamed by a program (e.g., a movie is being played back, music is being played back, etc.), then a user can be determined to be using a program running on the device and thus active on the device.

During times when the user is not active on the device, dirty data management module 204 can decrease the dirty data high threshold 304. The user can be determined to be not active on the device in different manners, such as in situations where the user is not interacting with the device (e.g., no user inputs have been received for a threshold amount of time such as 10 seconds), situations where the user is not using a program on the device (e.g., no requests for data have been received by drive access system 200 from a program for a threshold amount of time such as 10 seconds), situations where no I/O commands have been issued by I/O module 206 for a threshold amount of time (e.g., 10 seconds), and so forth. The dirty data high threshold 304 can be decreased to decrease the amount of dirty data 300 before synchronizing the dirty data begins, resulting in less dirty data being allowed to accumulate in performance part 112 during times when the user is not active on the device. The amount that dirty data high threshold 304 is decreased can vary, and can be a fixed amount (e.g., 512 megabytes) or a relative amount (e.g., 50% of the current setting, 5% of the amount of clean data at one or more priority levels (such as the low priority level), etc.). If the current state of the device changes and the user is active on the device, dirty data management module 204 increases dirty data high threshold 304 (e.g., to the default or initial setting value for threshold 304).

Additionally or alternatively, during times when the user is not active on the device, dirty data management module 204 can decrease the dirty data low threshold 302. The dirty data low threshold 302 can be decreased to increase the amount of dirty data 300 that is synchronized after synchronizing the dirty data begins, resulting in less dirty data being allowed to accumulate in performance part 112 during times when the user is not active on the device. The amount that dirty data low threshold 304 is decreased can vary, and can be a fixed amount (e.g., 64 megabytes) or a relative amount (e.g., 50% of the current setting, 1% of the amount of clean data at one or more priority levels (such as the low priority level) etc.). If the current state of the device changes and the user is active on the device or is using a program on the device, dirty data management module 204 increases dirty data low threshold 302 (e.g., to the default or initial setting value for threshold 302).

It should be noted that the threshold amount of time used in determining whether the user is active on the device can vary based on an amount of dirty data in performance part 112. For example, lower threshold amounts of time (e.g., 7 seconds, 3 seconds, etc.) can be used if there is a significant amount (e.g., at least a threshold amount such as 1 gigabyte or 25% of the amount of clean data at one or more priority levels (such as the low priority level)) of low priority dirty data in performance part 112, and larger threshold amounts of time (e.g., 10 seconds) can be used if there is not a significant amount (e.g., not at least the threshold amount) of low priority dirty data in performance part 112. Thus, the amount of time that dirty data management module 204 waits before decreasing dirty data high threshold 304 (and/or decreasing dirty data low threshold 302) can decrease as the amount of dirty data in performance part 112 increases.

During times when the user is active on the device, dirty data management module 204 can increase the dirty data high threshold 304. The dirty data high threshold 304 can be increased to increase the amount of dirty data 300 that accumulates before synchronizing the dirty data begins, and thus delaying synchronizing the dirty data. Delaying synchronizing the dirty data allows potential interference with the user resulting from synchronizing the dirty data to be delayed, and avoided if the user ceases to be active on the device prior to the increased dirty data high threshold 304 being satisfied. The amount that dirty data high threshold 304 is increased can vary, and can be a fixed amount (e.g., 1 gigabyte) or a relative amount (e.g., 50% of the current setting, 40% of the amount of clean data at one or more priority levels (such as the low priority level), etc.). If the current state of the device changes and the user is active on the device, dirty data management module 204 decreases dirty data high threshold 304 (e.g., to the default or initial setting value for threshold 304).

During times when the user is active on the device, whether to increase dirty data high threshold 304 and/or an amount to increase dirty data high threshold 304 can vary based on the type of I/O being performed. The type of I/O being performed can refer to the priority levels of LBAs of data being read and/or written, whether the data being read is being streamed, and so forth. Streaming data refers to data being retrieved from hybrid drive 102 as it is being consumed (e.g., played back) by a program rather than retrieving all of the data to be consumed by the program (e.g., the data for an entire movie or song) prior to consuming the data. The type of I/O being performed can be determined in various manners, such as by I/O module 206 monitoring the I/O commands to identify the type of I/O being performed, by drive access system 200 being notified of (or obtaining an indication elsewhere of) the type of I/O being performed by a program, and so forth.

In one or more embodiments, during times when the user is active on the device, dirty data high threshold 304 is increased by one amount if the LBAs associated with I/O commands being issued by I/O module 206 (e.g., at least a threshold number of commands over a threshold amount of time) are assigned a low priority, and increased by another (greater) amount if the LBAs associated with I/O commands being issued by I/O module 206 are assigned a higher priority. Alternatively, dirty data high threshold 304 can remain unchanged (not increased) if the LBAs associated with I/O commands being issued by I/O module 206 are assigned a low priority, and can be increased if the LBAs associated with I/O commands being issued by I/O module 206 are assigned a higher priority. By increasing dirty data high threshold 304 if the LBAs associated with I/O commands being issued by I/O module 206 are assigned a higher priority, synchronizing the dirty data is delayed more if the LBAs associated with I/O commands being issued by I/O module 206 are assigned a higher priority than if the LBAs associated with I/O commands being issued by I/O module 206 are assigned the low priority.

In one or more embodiments, during times when the user is active on the device, dirty data high threshold 304 can be increased as discussed above, but decreased (e.g., by a fixed or relative amount, to the default or initial setting value for threshold 304, etc.) at regular or irregular intervals based on the type of I/O being performed. For example, if data is being streamed from hybrid drive 102, dirty data high threshold 304 can be decreased at regular or irregular intervals due to dirty data management module 204 presuming that data can occasionally be synchronized during streaming of data without interfering with the use of the device by the user. Dirty data low threshold 302 can optionally be increased as well, allowing dirty data management module 204 to specify how much data is to synchronized (e.g., dirty data low threshold 302 may be set to be 64 megabytes less than dirty data high threshold 304).

The dirty data low and dirty high thresholds are discussed above with respect to an amount of dirty data. This dirty data can be dirty data in a part of hybrid drive 102 (e.g., performance part 112) across multiple (e.g., all) priority levels. Alternatively, dirty data can be tracked and different dirty data low and dirty data high thresholds implemented for each of multiple different priority levels. These dirty data low and dirty data high thresholds can be decreased and/or increased independently for different priority levels, allowing different amounts of dirty data at different priority levels to trigger starting and ceasing synchronizing dirty data.

In the discussions above, reference is made to dirty data being data stored in performance part 112 but not in base part 114, and that this dirty data in performance part 112 can be synchronized with base part 114. It should be noted that dirty data can also include data stored in base part 114 but not in performance part 112, and that this dirty data in base part 114 can be synchronized with (e.g., copied to or moved to) performance part 112. Situations can arise where data that is destined or targeted for the performance part (e.g., due to the priority level assigned to the LBAs of the data) is first written to base part 114 for various reasons, such as architecture and/or firmware restrictions, the sequential write speed of performance part 112 being slower than base part 114, hybrid drive 102 being overwhelmed by a significant number of I/O commands, and so forth. Drive access system 200 can monitor various information regarding the state of the device implementing system 200 analogous to the discussions above. Drive access system 200 can also monitor various information regarding dirty data in base part 114, such as amounts of clean and/or dirty data at one or more priority levels in base part 114, counters keeping tracking of amounts of data targeting performance part 112 but written in base part 114 (e.g., increasing the counter value in response to data targeting performance part 112 being written in base part 114 rather than performance part 112, and decreasing the counter value in response to dirty data being synchronized with performance part 112). Dirty data management module 204 determines when to provide indications to hybrid drive 102 to synchronize the dirty data in base part 114 with performance part 112. The determination can be made so as to reduce interference with use of the device by the user, to reduce interference with power saving modes of the device, to reduce interference with the remaining battery life of the device, and so forth analogous to the discussions above.

The indications provided to hybrid drive 102 to synchronize the dirty data in base part 114 with performance part 112 can take various forms analogous to the discussions above. For example, the indications can be dirty data low and dirty data high thresholds, with hybrid drive 102 beginning to synchronize dirty data in response to the amount of dirty data in base part satisfying (e.g., being equal to and/or greater than) the dirty data high threshold, and once synchronizing dirty data has begun hybrid drive 102 continues synchronizing dirty data until the amount of dirty data satisfies (e.g., is equal to and/or less than) the dirty data low threshold, at which point hybrid drive 102 ceases synchronizing the dirty data.

Figure 4:
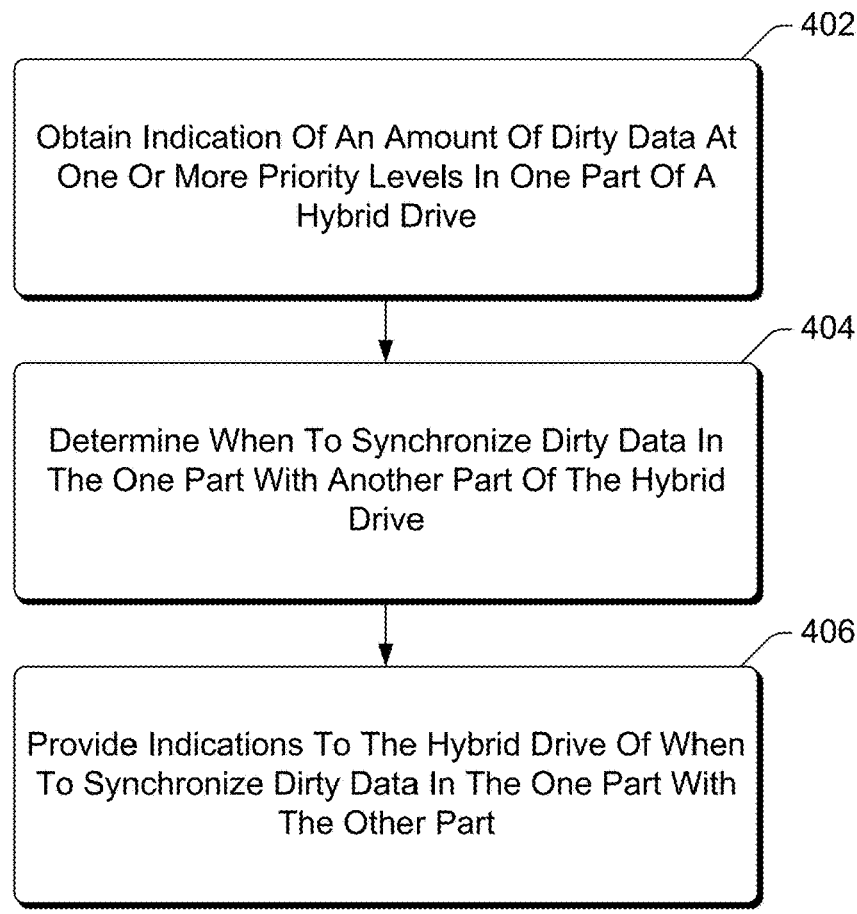
FIG. 4 is a flowchart illustrating an example process for implementing dirty data management for hybrid drives in accordance with one or more embodiments.

FIG. 4 is a flowchart illustrating an example process 400 for implementing dirty data management for hybrid drives in accordance with one or more embodiments. Process 400 is carried out by a drive access system, such as drive access system 200 of FIG. 2, and can be implemented in software, firmware, hardware, or combinations thereof. Process 400 is shown as a set of acts and is not limited to the order shown for performing the operations of the various acts. Process 400 is an example process for implementing dirty data management for hybrid drives; additional discussions of dirty data management for hybrid drives are included herein with reference to different figures.

In process 400, an indication of an amount of dirty data at one or more priority levels in a part of a hybrid drive is obtained (act 402). The hybrid drive has two parts including a performance part and a base part, and the dirty data can be data in the performance part or the base part as discussed above. These one or more priority levels can be a low priority level, as discussed above.

A determination is made as to when to synchronize dirty data in one of the parts with another of the parts (act 404). This determination is made so as to reduce interference with use of the computing device by a user and/or reduce interference with a power saving mode of the computing device as discussed above.

Indications are provided to the hybrid drive of when to synchronize dirty data in the one part with the other of the parts (act 406). These indications can be providing setting values for dirty data high threshold and a dirty data low threshold of the hybrid drive as discussed above.

Figure 5:
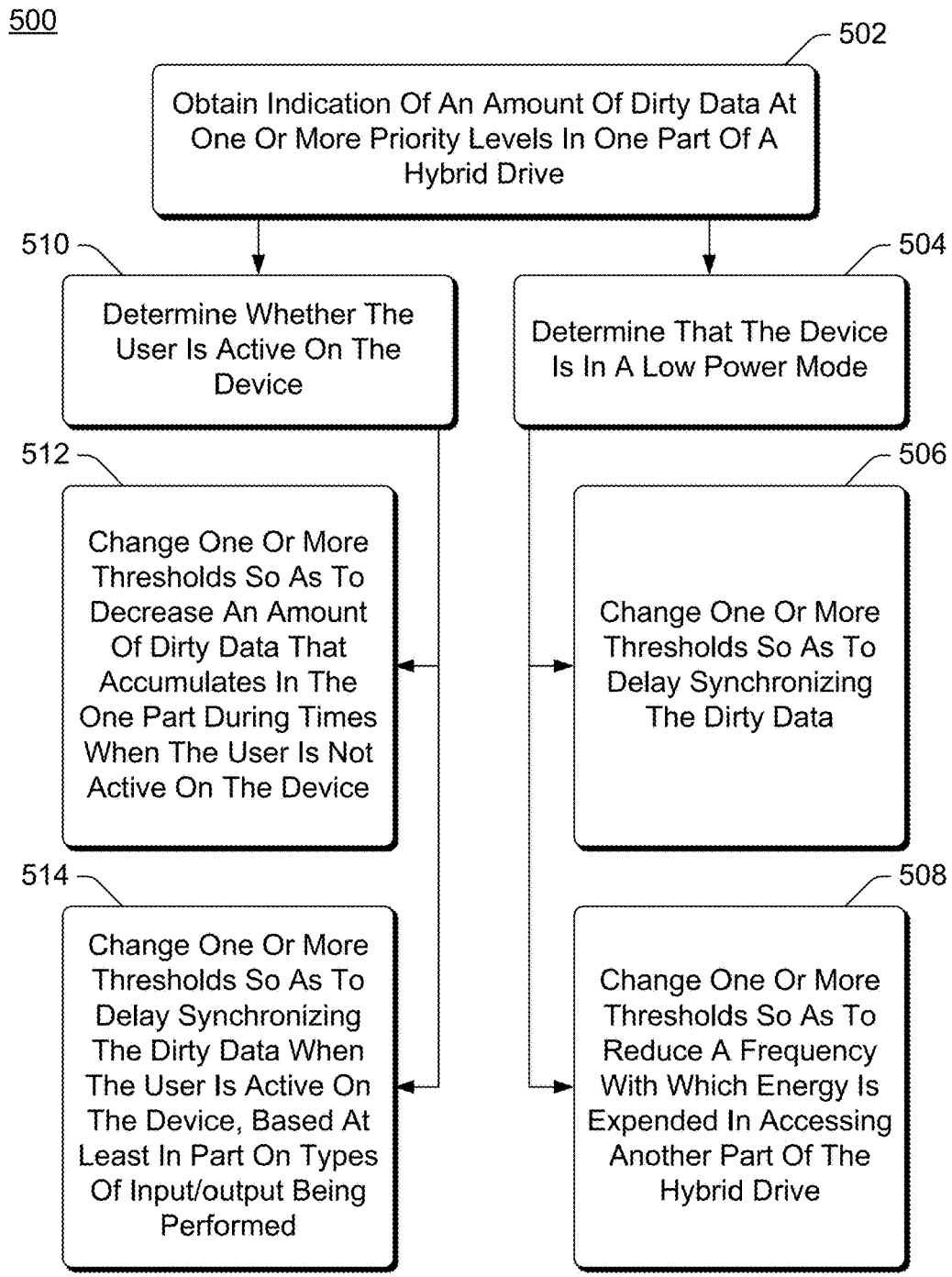
FIG. 5 is a flowchart illustrating another example process for implementing dirty data management for hybrid drives in accordance with one or more embodiments.

FIG. 5 is a flowchart illustrating another example process 500 for implementing dirty data management for hybrid drives in accordance with one or more embodiments. Process 500 is carried out by a drive access system of a device, such as drive access system 200 of FIG. 2, and can be implemented in software, firmware, hardware, or combinations thereof. Process 500 is shown as a set of acts and is not limited to the order shown for performing the operations of the various acts. Process 500 is an example process for implementing dirty data management for hybrid drives; additional discussions of dirty data management for hybrid drives are included herein with reference to different figures.

In process 500, an indication of an amount of dirty data at one or more priority levels in one part of a hybrid drive is obtained (act 502). The hybrid drive has two parts including a performance part and a base part, and the dirty data can be data in the performance part or the base part as discussed above. These one or more priority levels can be a low priority level, as discussed above.

A determination is made as to whether the device is in a power saving mode, and in response to the device being determined to be in a power saving mode (act 504), one or more changes are made. The device refers to the device including the drive access system implementing process 500. One or more thresholds can be changed so as to delay synchronizing the dirty data (act 506). These one or more thresholds in act 506 can be a dirty data high threshold as discussed above. Additionally or alternatively, one or more thresholds can be changed so as to reduce a frequency with which energy is expended in accessing another part of the hybrid drive such as the base part (act 508). These one or more thresholds in act 508 can be a dirty data high threshold and/or a dirty data low threshold as discussed above.

A determination can additionally or alternatively be made as to whether the user is active on the device (act 510). The device refers to the device including the drive access system implementing process 500. In response to a determination that the user is not active on the device, one or more thresholds are changed so as to decrease an amount of dirty data that accumulates in the one part (act 512). These one or more thresholds in act 512 can be a dirty data high threshold and/or a dirty data low threshold as discussed above.

In response to a determination that the user is active on the device, one or more thresholds are changed so as to delay synchronizing the dirty data (act 514). This determination can be based at least in part on types of input/output being performed as discussed above. These one or more thresholds in act 514 can be a dirty data high threshold and/or a dirty data low threshold as discussed above.

Various actions performed by various modules are discussed herein. A particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Although particular functionality is discussed herein with reference to particular modules, it should be noted that the functionality of individual modules discussed herein can be separated into multiple modules, and/or at least some functionality of multiple modules can be combined into a single module.

Figure 6:
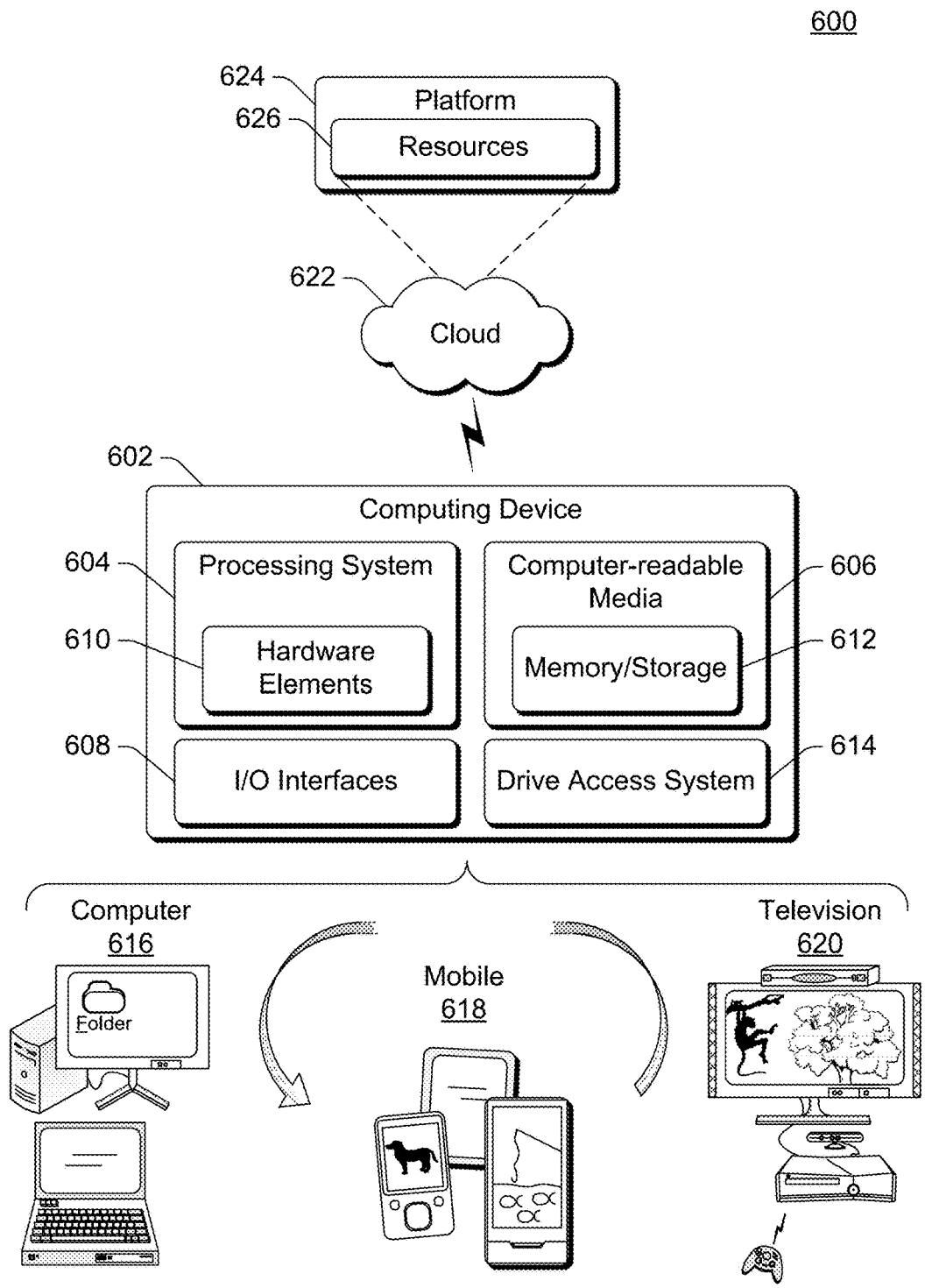
FIG. 6 illustrates an example system generally that includes an example computing device that is representative of one or more systems and/or devices that may implement the various techniques described herein.

FIG. 6 illustrates an example system generally at 600 that includes an example computing device 602 that is representative of one or more systems and/or devices that may implement the various techniques described herein. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O Interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including memory/storage 612. The memory/storage 612 represents memory/storage capacity associated with one or more computer-readable media. The memory/storage 612 may include volatile media (such as random access memory (RAM)) and/or nonvolatile media (such as read only memory (ROM), Flash memory, optical disks, magnetic disks, and so forth). The memory/storage 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 602 may be configured in a variety of ways as further described below to support user interaction.

Computing device 602 also includes a drive access system 614. Drive access system 614 provides various functionality, including determining priority levels for LBAs as discussed above. Drive access system 614 can implement, for example, drive access system 200 of FIG. 2.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of modules as a module that is executable by the computing device 602 as software may be achieved at least partially in hardware, e.g., through use of computer-readable storage media and/or hardware elements 610 of the processing system. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 602 may assume a variety of different configurations, such as for computer 616, mobile 618, and television 620 uses. Each of these configurations includes devices that may have generally different constructs and capabilities, and thus the computing device 602 may be configured according to one or more of the different device classes. For instance, the computing device 602 may be implemented as the computer 616 class of a device that includes a personal computer, desktop computer, a multi-screen computer, laptop computer, netbook, and so on.

The computing device 602 may also be implemented as the mobile 618 class of device that includes mobile devices, such as a mobile phone, portable music player, portable gaming device, a tablet computer, a multi-screen computer, and so on. The computing device 602 may also be implemented as the television 620 class of device that includes devices having or connected to generally larger screens in casual viewing environments. These devices include televisions, set-top boxes, gaming consoles, and so on.

The techniques described herein may be supported by these various configurations of the computing device 602 and are not limited to the specific examples of the techniques described herein. This functionality may also be implemented all or in part through use of a distributed system, such as over a "cloud" 622 via a platform 624 as described below.

The cloud 622 includes and/or is representative of a platform 624 for resources 626. The platform 624 abstracts underlying functionality of hardware (e.g., servers) and software resources of the cloud 622. The resources 626 may include applications and/or data that can be utilized while computer processing is executed on servers that are remote from the computing device 602. Resources 626 can also include services provided over the Internet and/or through a subscriber network, such as a cellular or Wi-Fi network.

The platform 624 may abstract resources and functions to connect the computing device 602 with other computing devices. The platform 624 may also serve to abstract scaling of resources to provide a corresponding level of scale to encountered demand for the resources 626 that are implemented via the platform 624. Accordingly, in an interconnected device embodiment, implementation of functionality described herein may be distributed throughout the system 600. For example, the functionality may be implemented in part on the computing device 602 as well as via the platform 624 that abstracts the functionality of the cloud 622.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
   one or more processors;
   a hybrid drive comprising a performance part and a base part; and
   a memory storing instructions that, when executed by the one or more processors, cause the system to at least:
   determine an amount of data stored in the performance part of the hybrid drive that is not synchronized with the base part;
   determine when to initiate synchronization of at least some of the data based on a portion of the data with a lowest priority of use by the system, and based on the amount of the data stored in the performance part that is not synchronized with the base part; and
   indicating to the hybrid drive when to synchronize the portion of data with the lowest priority between the performance part and the base part, the synchronization of the portion of the data being initiated so as to maintain more low priority data than high priority data in the performance part of the hybrid drive.

2. The system as recited in claim 1, wherein the performance part is higher performance than the base part.

3. The system as recited in claim 1, wherein the determining when to initiate synchronization is further based on times when a user is not active on the system.

4. The system as recited in claim 1, wherein the determining is further based on values set for a data high threshold and a data low threshold, the hybrid drive synchronizing the data in response to the amount of the data satisfying the data high threshold, and continuing until the amount of the data satisfies the data low threshold.

5. The system as recited in claim 1, wherein the determining is further based on delaying the synchronization when a user is active on the system.

6. The system as recited in claim 1, further comprising determining whether to delay the synchronization based on types of input/output being performed and priorities of input/output being performed.

7. The system as recited in claim 6, further comprising allowing the synchronization at regular or irregular intervals in response to the types of input/output being performed comprising streaming data from the hybrid drive.

8. The system as recited in claim 4, further comprising at least one of:
   decreasing the value set for the data low threshold to increase an amount of the data that is synchronized; and
   increasing the value set for the data high threshold to delay the synchronization.

9. A method for managing data stored in a hybrid drive comprising a performance part and a base part, the method comprising:
   determine an amount of data stored in the performance part of the hybrid drive that is not synchronized with the base part;
   determine when to initiate synchronization of at least some of the data based on a portion of the data with a lowest priority of use, and based on the amount of the data stored in the performance part that is not synchronized with the base part; and
   indicating to the hybrid drive when to synchronize the portion of data with the lowest priority between the performance part and the base part, the synchronization of the portion of the data being initiated so as to maintain more low priority data than high priority data in the performance part of the hybrid drive.

10. The method as recited in claim 9, wherein the performance part is higher performance than the base part.

11. The method as recited in claim 9, wherein the determining when to initiate synchronization is further based on times when a user is not active on a computing device coupled to the hybrid drive.

12. The method as recited in claim 9, wherein the determining is further based on values set for a data high threshold and a data low threshold, the hybrid drive synchronizing the data in response to the amount of the data satisfying the data high threshold, and continuing until the amount of the data satisfies the data low threshold; further comprising:
   decreasing the value set for the data low threshold to increase an amount of the data that is synchronized; and
   increasing the value set for the data high threshold to delay the synchronization.

13. The method as recited in claim 9, wherein the determining is further based on delaying the synchronization when a user is active on a computing device coupled to the hybrid drive.

14. The method as recited in claim 9, further comprising:
   determining whether to delay the synchronization based on types of input/output being performed and priorities of input/output being performed; and
   allowing the synchronization at regular or irregular intervals in response to the types of input/output being performed comprising streaming data from the hybrid drive.

15. A computing device comprising:
   one or more processors;
   a hybrid drive comprising a performance part and a base part; and
   a memory storing instructions that, when executed by the one or more processors, cause the computing device to at least:
   determine an amount of data stored in the performance part of the hybrid drive that is not synchronized with the base part;
   determine when to initiate synchronization of at least some of the data based on a portion of the data with a lowest priority of use by the computing device, and based on the amount of the data stored in the performance part that is not synchronized with the base part; and
   indicating to the hybrid drive when to synchronize the portion of data with the lowest priority between the performance part and the base part, the synchronization of the portion of the data being initiated so as to maintain more low priority data than high priority data in the performance part of the hybrid drive.

16. The computing device as recited in claim 15, wherein the performance part is higher performance than the base part.

17. The computing device as recited in claim 15, wherein the determining when to initiate synchronization is further based on times when a user is not active on the computing device.

18. The computing device as recited in claim 15, wherein the determining is further based on values set for a data high threshold and a data low threshold, the hybrid drive synchronizing the data in response to the amount of the data satisfying the data high threshold, and continuing until the amount of the data satisfies the data low threshold, further comprising:
   decreasing the value set for the data low threshold to increase an amount of the data that is synchronized; and
   increasing the value set for the data high threshold to delay the synchronization.

19. The computing device as recited in claim 15, wherein the determining is further based on delaying the synchronization when a user is active on the computing device.

20. The computing device as recited in claim 15, further comprising:
   determining whether to delay the synchronization based on types of input/output being performed and priorities of input/output being performed; and
   allowing the synchronization at regular or irregular intervals in response to the types of input/output being performed comprising streaming data from the hybrid drive.

* * * * *